United States Patent
Zhang

(10) Patent No.: US 12,293,576 B2
(45) Date of Patent: May 6, 2025

(54) DETERMINING TYPE OF TO-BE-CLASSIFIED IMAGE BASED ON SIGNAL WAVEFORM GRAPH

(71) Applicant: BEIJING ZHENHEALTH TECHNOLOGY CO., LTD., Beijing (CN)

(72) Inventor: Dongdong Zhang, Beijing (CN)

(73) Assignee: BEIJING ZHENHEALTH TECHNOLOGY CO., LTD., Beijing (CN)

(*) Notice: Subject to any disclaimer, the term of this patent is extended or adjusted under 35 U.S.C. 154(b) by 1 day.

(21) Appl. No.: 17/642,568

(22) PCT Filed: Aug. 17, 2021

(86) PCT No.: PCT/CN2021/112932
§ 371 (c)(1),
(2) Date: Mar. 11, 2022

(87) PCT Pub. No.: WO2022/198898
PCT Pub. Date: Sep. 29, 2022

(65) Prior Publication Data
US 2024/0046632 A1    Feb. 8, 2024

(30) Foreign Application Priority Data

Mar. 26, 2021 (CN) .......................... 202110322703.6

(51) Int. Cl.
*G06V 10/86* (2022.01)
*G06V 10/22* (2022.01)
(Continued)

(52) U.S. Cl.
CPC ............ *G06V 10/86* (2022.01); *G06V 10/225* (2022.01); *G06V 10/267* (2022.01); *G06V 10/30* (2022.01);
(Continued)

(58) Field of Classification Search
CPC .... G06V 10/86; G06V 10/225; G06V 10/267; G06V 10/30; G06V 10/34; G06V 10/764; G06V 2201/03
See application file for complete search history.

(56) References Cited

U.S. PATENT DOCUMENTS

| 2008/0085048 A1 | 4/2008 | Venetsky et al. |
| 2010/0119110 A1* | 5/2010 | Kanda ..................... G06F 18/21 382/128 |

FOREIGN PATENT DOCUMENTS

| CN | 106446936 A | 2/2017 | |
| CN | 108596169 A * | 9/2018 | ........... G06K 9/3241 |

(Continued)

*Primary Examiner* — Casey L Kretzer
(74) *Attorney, Agent, or Firm* — WCF IP

(57) ABSTRACT

An image classification method, apparatus, and device. The method includes: inputting a to-be-classified image dataset, where the image dataset includes to-be-classified images; cropping each of the to-be-classified images with a center of the to-be-classified image as a reference center point to obtain an image having a preset size and including a specific region as a standard image; selecting a pixel array of any single channel in the standard image and drawing a corresponding signal waveform graph based on the pixel array; and determining a type of the to-be-classified image. After the standard image including the specific region is obtained by cropping the to-be-classified image, the pixel array of the any single channel is selected from the standard image, and then the signal waveform graph is drawn based on the selected pixel array of the single channel, to classify the to-be-classified image based on the drawn signal waveform graph.

16 Claims, 7 Drawing Sheets

(51) Int. Cl.
  *G06V 10/26*     (2022.01)
  *G06V 10/30*     (2022.01)
  *G06V 10/34*     (2022.01)
  *G06V 10/764*    (2022.01)

(52) U.S. Cl.
  CPC ............ *G06V 10/34* (2022.01); *G06V 10/764* (2022.01); *G06V 2201/03* (2022.01)

(56) References Cited

FOREIGN PATENT DOCUMENTS

| CN | 108921076 A | 11/2018 |
| CN | 109359693 A | 2/2019 |
| CN | 112801049 A | 5/2021 |

* cited by examiner

|       | Black | Gray | White | Red |     | Orange | Yellow | Green | Cyan | Blue | Purple |
|-------|-------|------|-------|-----|-----|--------|--------|-------|------|------|--------|
| H_min | 0     | 0    | 0     | 0   | 156 | 11     | 26     | 35    | 78   | 100  | 125    |
| H_max | 180   | 180  | 180   | 10  | 180 | 25     | 34     | 77    | 99   | 124  | 155    |
| S_min | 0     | 0    | 0     | 43  |     | 43     | 43     | 43    | 43   | 43   | 43     |
| S_max | 255   | 43   | 30    | 255 |     | 255    | 255    | 255   | 255  | 255  | 255    |
| V_min | 0     | 46   | 221   | 46  |     | 46     | 46     | 46    | 46   | 46   | 46     |
| V_max | 46    | 220  | 255   | 255 |     | 255    | 255    | 255   | 255  | 255  | 255    |

(a)

(b)

DETERMINING TYPE OF TO-BE-CLASSIFIED IMAGE BASED ON SIGNAL WAVEFORM GRAPH

CROSS REFERENCE TO RELATED APPLICATION(S)

This application claims priority to Chinese Patent Application No. 202110322703.6, filed with the China National Intellectual Property Administration (CNIPA) on Mar. 26, 2021 and entitled "IMAGE CLASSIFICATION METHOD, APPARATUS, AND DEVICE", which is incorporated herein by reference in its entirety.

TECHNICAL FIELD

The present disclosure relates to the technical field of image classification and recognition, and in particular, to an image classification method, apparatus, and device.

BACKGROUND ART

Usually, storage and transmission of medical images, diagnosis of doctors, and tracking of courses of diseases are performed in the dimension of patients. Mixing of complex and different types of images is bound to cause great trouble for subsequent sorting, archiving, and research of different types of images. In the related art, an image recognition model or a currently popular deep learning convolutional neural network (CNN) model may be used for image classification. However, when the image recognition model is used for image classification, the recognition model needs to be built in advance. In a process of building the recognition model, several stages such as feature extraction, feature coding, space constraint, classifier design, and model fusion are required. A research and development cycle is long, and requirements for professional skills of algorithm designers and algorithm deployment are high. When the deep learning CNN model is used for image classification, although manpower is reduced and fast and efficient automatic sorting is implemented, it takes a lot of time to build the CNN model, label training datasets, train model parameters, and optimize the model in an early stage. Requirements for technical skills and hardware configuration are high. This makes replicability and a generalization ability of a traditional image classification method weak, and it is difficult to implement out-of-the-box, rapid replication, and applicability to various complex and changeable clinical medical scenarios.

SUMMARY

In view of this, it is necessary to provide an image classification method, apparatus, and device that can quickly and accurately distinguish images, implement out-of-the-box and fast replication, and are applicable to various application scenarios.

To implement the foregoing objectives, the present disclosure provides the following solutions:

According to one aspect of this application, an image classification method is provided, including:
inputting a to-be-classified image dataset, where the image dataset includes to-be-classified images;
cropping each of the to-be-classified images with a center of the to-be-classified image as a reference center point to obtain an image having a preset size and including a specific region as a standard image;
selecting a pixel array of any single channel in the standard image and drawing a corresponding signal waveform graph based on the pixel array; and
determining a type of the to-be-classified image based on the signal waveform graph.

In a possible implementation, after the inputting a to-be-classified image dataset, the method may further include:
filtering the to-be-classified images in the image dataset based on image sizes and/or image colors.

In a possible implementation, the selecting a pixel array of any single channel in the standard image and drawing a corresponding signal waveform graph based on the pixel array may include:
selecting the pixel array of the any single channel in the standard image;
performing row compression on a row pixel array and column compression on a column pixel array in the pixel array to obtain a compressed row pixel array and a compressed column pixel array;
performing curve smoothing on the compressed row pixel array and the compressed column pixel array; and
drawing the corresponding signal waveform graph based on a smoothed compressed row pixel array and compressed column pixel array.

In a possible implementation, the following formulas may be used to perform the row compression on the row pixel array and the column compression on the column pixel array in the pixel array:

$$y\_row = img\_r.sum(axis=0) \quad \text{\# row pixel compression}$$

$$y\_col = img\_r.sum(axis=1) \quad \text{\# column pixel compression}$$

where axis represents a dimension of summation of pixel values, axis=0 represents summation of pixel values in each row, and axis=1 represents summation of pixel values in each column.

In a possible implementation, after the curve smoothing is performed on the compressed row pixel array and the compressed column pixel array, the method may further include: performing a logarithmic operation on a smoothed compressed row pixel array and compressed column pixel array.

In a possible implementation, the determining a type of the to-be-classified image based on the signal waveform graph may include:
determining the type of the to-be-classified image based on at least one of a change rate of pixel values in a signal waveform curve in the signal waveform graph, prominence of each peak in the signal waveform graph, and a percentage of column amplitude to row amplitude in the signal waveform curve.

In a possible implementation, when the corresponding signal waveform graph is drawn based on the pixel array, the method may further include:
detecting peaks in the signal waveform graph based on a peak attribute, calculating prominence of the peaks in the signal waveform graph, and processing the signal waveform graph based on the prominence of the peaks;
where the processing the signal waveform graph based on the prominence of the peaks includes: removing peaks with prominence smaller than a preset minimum prominence threshold.

In a possible implementation, the method may further include:
preprocessing the to-be-classified image, locating a mark region in the to-be-classified image, and determining the type of the to-be-classified image based on a shape of the located mark region.

According to one aspect of this application, an image classification apparatus is further provided, including a data input module, an image cropping module, a waveform graph drawing module, and a first type determining module.

The data input module is configured to input a to-be-classified image dataset, where the image dataset includes to-be-classified images.

The image cropping module is configured to crop each of the to-be-classified images with a center of the to-be-classified image as a reference center point to obtain an image having a preset size and including a specific region as a standard image.

The waveform graph drawing module is configured to select a pixel array of any single channel in the standard image and draw a corresponding signal waveform graph based on the pixel array.

The first type determining module is configured to determine a type of the to-be-classified image based on the signal waveform graph.

According to another aspect of this application, an image classification device is further provided, including:
a processor; and
a memory configured to store an instruction executable by the processor; where
the processor is configured to implement any one of the foregoing methods when executing the executable instruction.

After the standard image including the specific region is obtained by cropping the to-be-classified image, the pixel array of the any single channel is selected from the standard image, and then the signal waveform graph is drawn based on the selected pixel array of the single channel, to classify the to-be-classified image based on the drawn signal waveform graph. In comparison with the related art in which an image recognition model and a deep learning CNN model are used, various types of images can be quickly, accurately, and efficiently classified. In addition, only the foregoing processing needs to be performed on the to-be-classified images to generate corresponding signal waveform graphs, without a need to acquire and label a large amount of sample data or train the recognition model. In this way, the image classification method in the embodiments of this application is out of the box, does not depend on sample data, and is more applicable to various image classification application scenarios. This effectively improves replicability and a generalization ability of the image classification method.

BRIEF DESCRIPTION OF THE DRAWINGS

To explain the technical solutions in embodiments of the present disclosure or in the prior art more clearly, the accompanying drawings required in the embodiments will be described below briefly. Apparently, the accompanying drawings in the following description show merely some embodiments of the present disclosure, and other drawings can be derived from these accompanying drawings by those of ordinary skill in the art without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely some rather than all of the embodiments of the present disclosure. Based on the embodiments of the present disclosure, all other embodiments obtained by the person of ordinary skill in the art without creative efforts shall fall within the protection scope of the present disclosure.

To make the foregoing objective, features, and advantages of the present disclosure clearer and more comprehensible, the present disclosure will be further described in detail below with reference to the accompanying drawings and specific embodiments.

Figure 1:
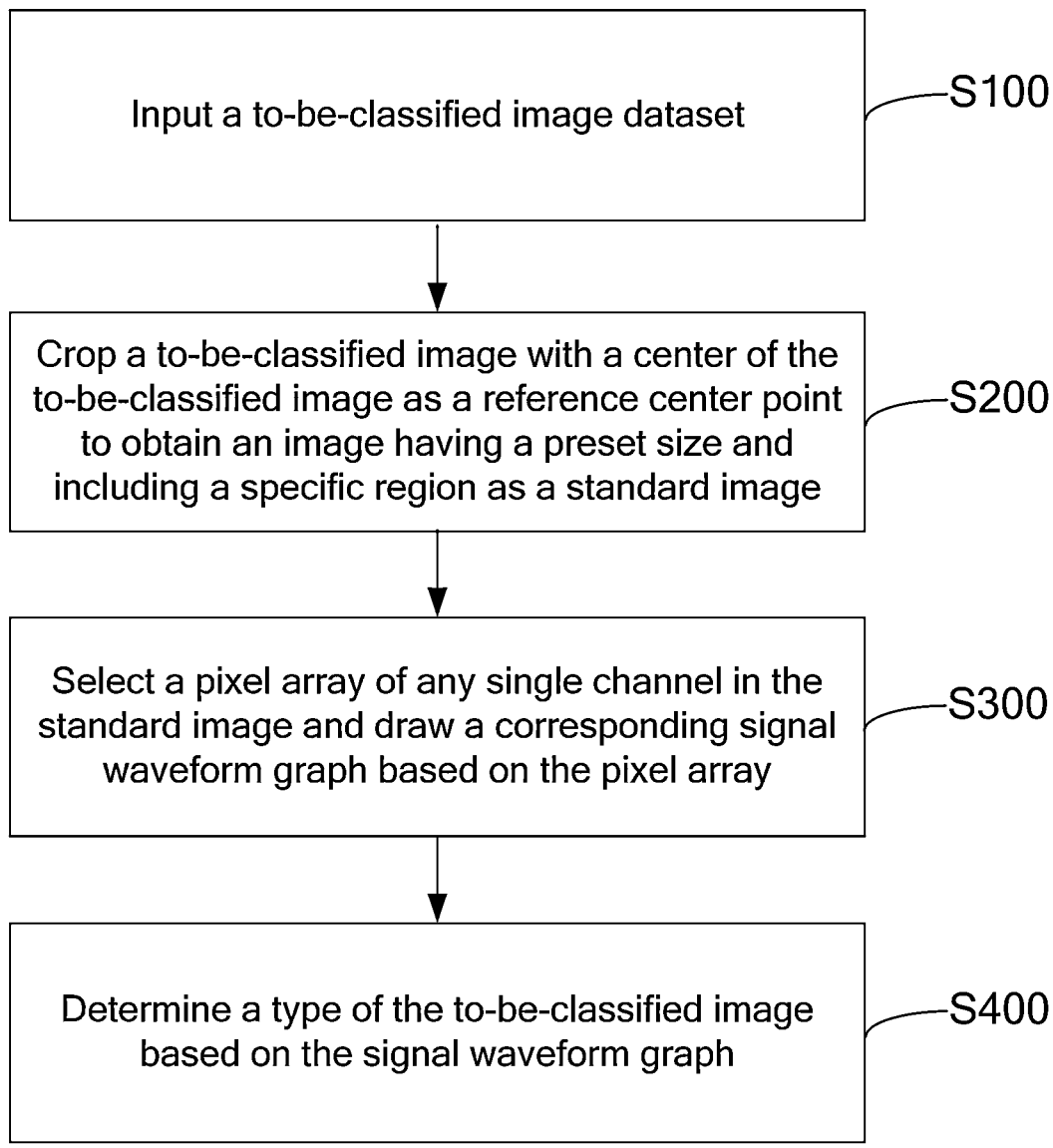
FIG. 1 is a flowchart of an image classification method according to an embodiment of this application.

FIG. 1 is a flowchart of an image classification method according to an embodiment of this application. As shown in FIG. 1, the method includes the following steps: Step S100: Input a to-be-classified image dataset. It should be noted that there are a plurality of to-be-classified images in the image dataset, and types of the to-be-classified images are different. Specifically, in terms of eye image data, the image dataset may include various images such as optical coherence tomography (OCT) images, eye B-scan ultrasound images, graphic reports, fundus fluorescein angiography (FFA) images, fundus images acquired by fundus cameras, and external eye images. Step S200: Crop each of the to-be-classified images with a center of the to-be-classified image as a reference center point to obtain an image having a preset size and including a specific region as a standard image. Step S300: Select a pixel array of any single channel in the standard image and draw a corresponding signal waveform graph based on the pixel array. Step S400: Determine a type of the to-be-classified image based on the drawn signal waveform graph.

Therefore, in the image classification method in this embodiment of this application, after the standard image including the specific region is obtained by cropping the to-be-classified image, the pixel array of the any single channel is selected from the standard image, and then the signal waveform graph is drawn based on the selected pixel array of the single channel, to classify the to-be-classified image based on the drawn signal waveform graph. In comparison with the related art in which an image recognition model and a deep learning CNN model are used, various types of images can be quickly, accurately, and efficiently classified. In addition, only the foregoing processing needs to be performed on the to-be-classified images to generate corresponding signal waveform graphs, without a need to acquire and label a large amount of sample data or train the recognition model. In this way, the image classification method in the embodiments of this application is out of the box, does not depend on sample data, and is more applicable to various image classification application scenarios. This effectively improves replicability and a generalization ability of the image classification method.

It should be noted that when the to-be-classified image is cropped with the center of the to-be-classified image as the reference center point to obtain the image having the preset size and including the specific region as the standard image, the specific region is associated with a category to which the to-be-classified images included in the image dataset belong.

In other words, although there are the plurality of to-be-classified images in the image dataset, and the types of different to-be-classified images are different, the to-be-classified images all belong to the same category. For example, in terms of clinical medical images, the to-be-classified images included in the image dataset all belong to a category of eye detection data, but different to-be-classified images correspond to different image data in eye detection images. For example, the to-be-classified image may be a fundus image acquired by a fundus camera, an external eye image, an eye B-scan ultrasound image, an OCT image, an FFA image, or the like. For another example, the to-be-classified images included in the image dataset all belong to a category of chest detection data, and the to-be-classified images included in the image dataset may be data such as chest computed tomography (CT) images and chest B-scan ultrasound images. In addition, the to-be-classified images in the image dataset may alternatively be image data acquired in another application field, which is not enumerated herein.

In other words, the image dataset may be different image data acquired in different application scenarios. However, it should be noted that the to-be-classified images in the image dataset should all belong to different forms or different types of image data obtained in the same application scenario.

In addition, when the to-be-classified image is cropped, the specific region may be determined based on an application scenario to which the to-be-classified image in the image dataset belongs The eye detection data in the clinical medical images is also used as an example. The specific region is a region that envelopes an entire pupil or macula lutea. The preset size may also be set based on the application scenario to which the to-be-classified image in the image dataset belongs. Different preset sizes are set in different application scenarios.

Further, after the to-be-classified image dataset is input, the image classification method in the embodiments of this application may further include: Filter the to-be-classified images in the image dataset based on image sizes and/or image colors. It should be noted that a sequence of filtering the to-be-classified images in the image dataset based on the image sizes and filtering the images based on the image colors may be flexibly set based on an actual situation.

Figure 2:
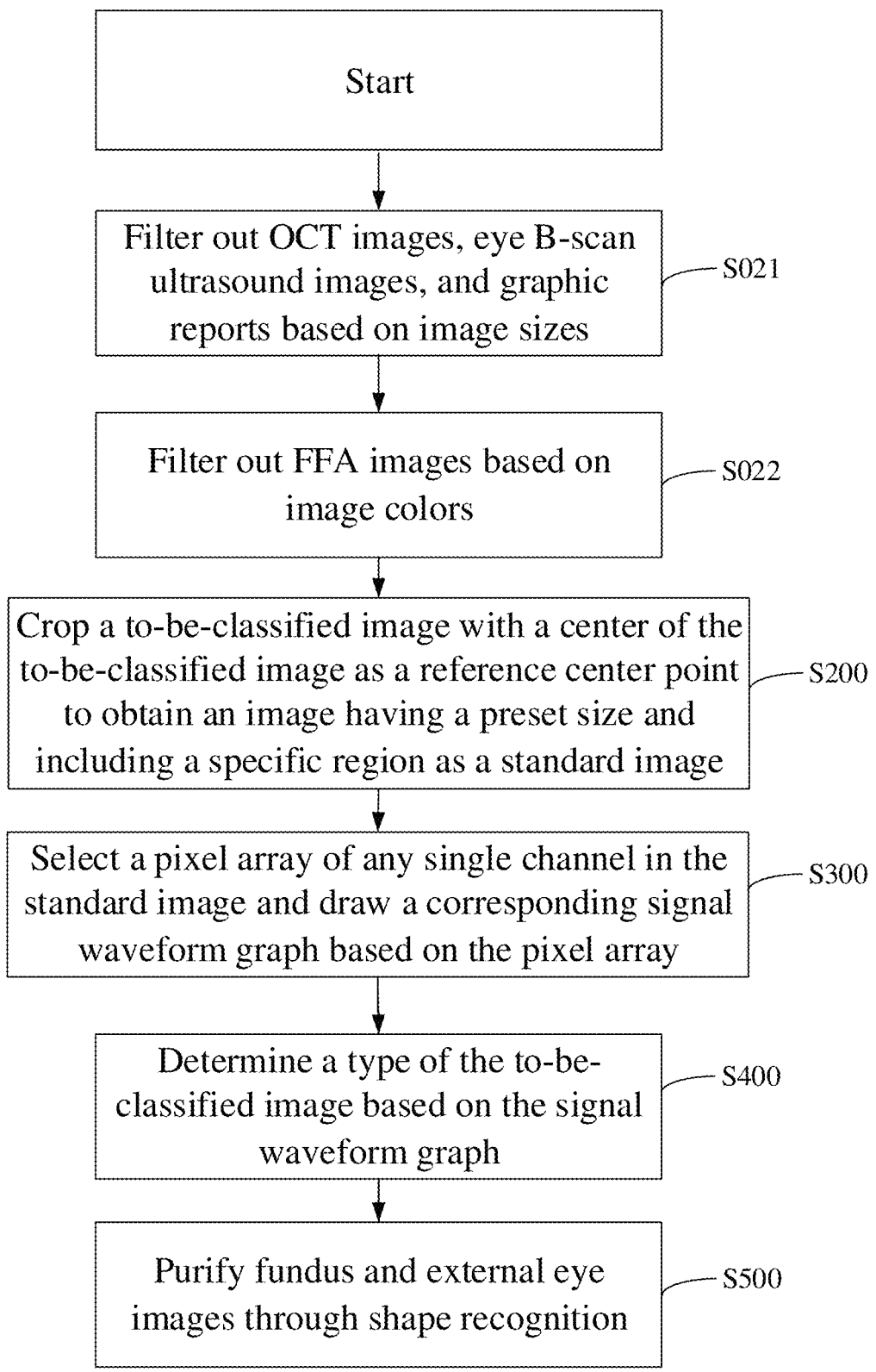
FIG. 2 is another flowchart of an image classification method according to an embodiment of this application.

For example, referring to FIG. 2, in a possible implementation, if the image dataset is clinical medical eye data, after the to-be-classified image dataset is input in step S100, step S021 may be performed first: Filter the to-be-classified images in the image dataset based on the image sizes to filter out small-sized image data, such as OCT images, eye B-scan ultrasound images, and graphic reports in the image dataset. Then, step S022 is performed: Filter remaining to-be-classified images in a filtered image dataset based on the image colors to recognize the colors and filter out data such as FFA images.

Figures 3, 4:
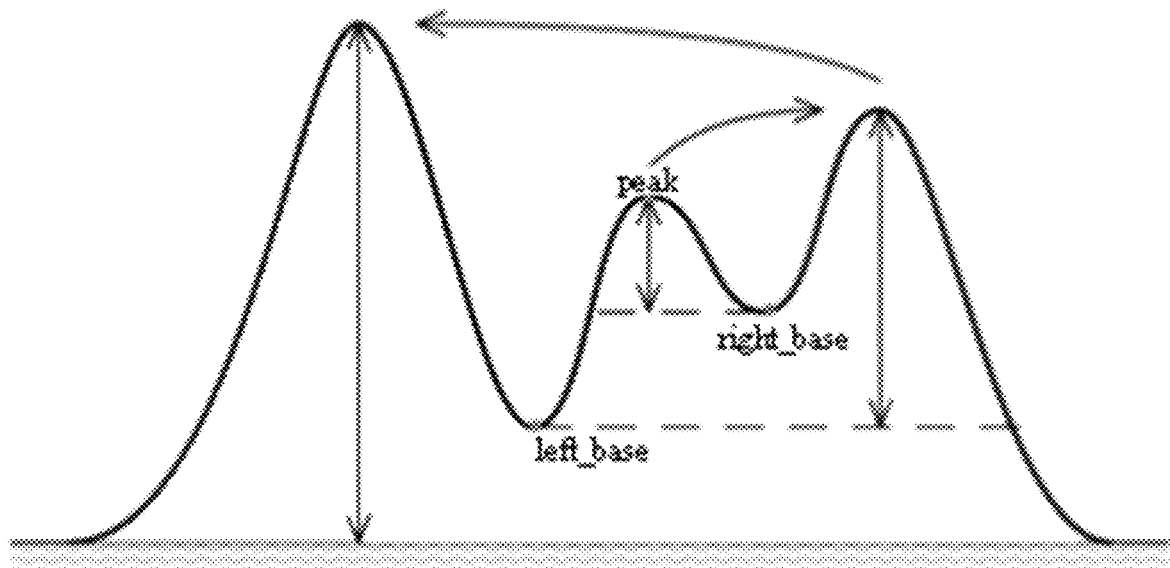
FIG. 3 is a diagram of a hue threshold distribution of different colors in a hue, saturation, and value (HSV) color space according to which to-be-classified images in an image dataset are filtered based on image colors in an image classification method according to an embodiment of this application.
FIG. 4 is a principle diagram of detecting prominence of each peak in a drawn signal waveform graph in an image classification method according to an embodiment of this application.

More specifically, a color recognition principle used to filter the remaining to-be-classified images in the image dataset based on the image colors may be determined based on a hue threshold distribution of different colors in an HSV color space (referring to FIG. 3).

Because FFA images are grayscale images, and fundus images and external eye images are all red green blue (RGB) three-channel color images, the three types of images may be subdivided through color recognition to filter out the FFA images. Hue values of the fundus images and external eye images are all within a hue interval ['red2', 'red', 'orange'].

After the to-be-classified images in the image dataset are filtered by using the foregoing methods, perform step S200: Crop each of the to-be-classified images with the center of the to-be-classified image as the reference center point to obtain the image having the preset size and including the specific region as the standard image. As described above, the specific region may be selected and the preset size may be set based on the application scenario to which the image dataset belongs. For clinical medical eye image data, the specific region is a region that envelopes the entire pupil or macula lutea. The preset size may of a side length of 700 pixels. Cropping the to-be-classified image can remove interference of frame noise to facilitate subsequent operations.

After the standard image is obtained by cropping the to-be-classified image, perform step S300: Select the pixel array of the any single channel in the standard image and draw the corresponding signal waveform graph based on the pixel array. It should be noted that when the pixel array of the any single channel in the image is selected and the corresponding signal waveform graph is drawn and generated, the selection may be performed based on a background color of the to-be-classified image. In other words, in the image classification method in the embodiments of this application, the selected single channel is a channel close to the background color of the to-be-classified image.

Fundus image data is also used as an example. Because a background color of a fundus image is close to yellow, a pixel array of a single channel R in the standard image may be selected. Then, the signal waveform graph is drawn and generated based on the pixel array of the selected channel R.

In a possible implementation, that the pixel array of the any single channel in the standard image is selected and the corresponding signal waveform graph is drawn based on the pixel array may be implemented in the following manner:

First, select the pixel array of the any single channel in the standard image. Then, perform row compression on a row pixel array and column compression on a column pixel array in the pixel array to obtain a compressed row pixel array and a compressed column pixel array. Next, perform curve smoothing on the compressed row pixel array and the compressed column pixel array to remove noise in the compressed row pixel array and the compressed column pixel array. Finally, draw the corresponding signal waveform graph based on a smoothed compressed row pixel array and compressed column pixel array.

The following formulas may be used to perform the row compression and column compression on the selected pixel array of the single channel in the standard image:

$y\_row = img\_r.sum(axis=0)$ # Row pixel compression $y\_col = img\_r.sum(axis=1)$ # Column pixel compression where axis represents a dimension of summation of pixel values, axis=0 represents summation of pixel values in each row, and axis=1 represents summation of pixel values in each column.

After the row compression and column compression are performed on the selected pixel array of the single channel, perform the curve smoothing on the compressed row pixel array and the compressed column pixel array. In a possible implementation, the smoothing may be performed by calling the savgol_filter method in the cipy.signal library to remove noise in the compressed row pixel array and the compressed column pixel array.

More specifically, curve smooth filtering is performed on the compressed row pixel array and the compressed column pixel array by using the following formula:

$$x_{k\_smooth} = \overline{x}_k = \frac{1}{H}\sum_{i=-w}^{+w} x_{k+1}h_i$$

where $h_i$ represents a smoothing coefficient; H=2w+1 represents a width of a filtering window (namely, a total number of measurement points); and x=(−w, −w+1, . . . , 0, 1, . . . , w−1, w) represents each measurement point.

After the compressed row pixel array and the compressed column pixel array are smoothed, the method may further include: Perform a logarithmic operation on the smoothed compressed row pixel array and compressed column pixel array. Performing the logarithmic operation on the smoothed compressed row pixel array and compressed column pixel array can reduce an absolute value of the data to facilitate calculation, and also compress a variable scale and weaken collinearity and heteroscedasticity of a model without changing a property and correlation of the data.

After the smoothed compressed row pixel array and compressed column pixel array are obtained, draw the corresponding signal waveform graph based on the smoothed compressed row pixel array and compressed column pixel array.

In a possible implementation, the plt.plot function in the matplotlib.pyplot library may be directly called when the signal waveform graph of the compressed pixel array is drawn.

After the signal waveform graph of the selected pixel array of the single channel is drawn and generated, perform step S400: Determine the type of the to-be-classified image based on the drawn signal waveform graph.

Specifically, when the type of the to-be-classified image is determined based on the signal waveform graph, a change rate of pixel values in a signal waveform curve, prominence of each peak in the signal waveform curve, and a percentage of column amplitude to row amplitude in the signal waveform curve may be obtained based on the drawn signal waveform graph. Then, the type of the to-be-classified image is recognized and determined based on at least one of the change rate of the pixel values in the signal waveform curve, the prominence of each peak in the signal waveform graph, and the percentage of the column amplitude to the row amplitude in the signal waveform curve.

More specifically, in the image classification method according to an embodiment of this application, the change rate of the pixel values in the signal waveform curve may be calculated based on the drawn signal waveform graph. The following formula is used:

$$\text{delta} = \frac{\max(y_{smooth}) - \min(y_{smooth})}{\min(y_{smooth})},$$

where delta represents the change rate of the pixel values in the signal waveform curve; $\max(y_{smooth})$ represents a maximum pixel value after Savitzky-Golay smooth filtering is performed; and $\min(y_{smooth})$ represents a minimum pixel value after the Savitzky-Golay smooth filtering is performed.

Further, in a possible implementation, the prominence of each peak in the signal waveform curve may be obtained in the following manner:

First, detect each peak in the signal waveform graph based on a peak attribute. Specifically, the peak in the signal waveform graph may be detected by directly calling the find_peaks method in the scipy.signal library. An interval between positions of recognized peak signals in a same cycle is controlled by a parameter distance. A minimum threshold $peak_{min}$ that the peak signal needs to meet is calculated by using the following formula:

$$peak_{min} = \min(y_{smooth}) + 0.35 \times (\max(y_{smooth}) - \min(y_{smooth}))$$

Then, calculate the prominence of each of the detected peaks. In a possible implementation, the peak_prominences method in the scipy.signal library may be called to calculate the prominence of each peak in the signal waveform graph. After the prominence of each peak is calculated, the image classification method according to an embodiment of this application further includes: Remove peaks with small prominence to implement post-processing of the signal waveform graph. This prevents the peaks with the small prominence from interfering with subsequent waveform recognition. In other words, remove peaks with prominence smaller than a preset minimum prominence threshold in the signal waveform curve to obtain a final signal waveform graph. It should be noted that a value range of the preset minimum prominence threshold may be $\min(y_{smooth}) + 0.35 \times (\max(y_{smooth}) - \min(y_{smooth}))$.

A basic principle of the prominence is shown in FIG. 4. Vertical arrows shown in FIG. 4 represent prominence of three peaks respectively, and a calculation formula is as follows:

$$\text{pro min ence} = \min(peak-left_{base}, peak-right_{base})$$

Next, calculate the percentage of the column amplitude to the row amplitude in the signal waveform curve based on the processed signal waveform graph. The percentage percent_col_in_row of the column amplitude to the row amplitude is used as one of criteria for distinguishing between a fundus image and an external eye image, and a detected significant peak signal is displayed in the signal waveform graph.

Figure 5:
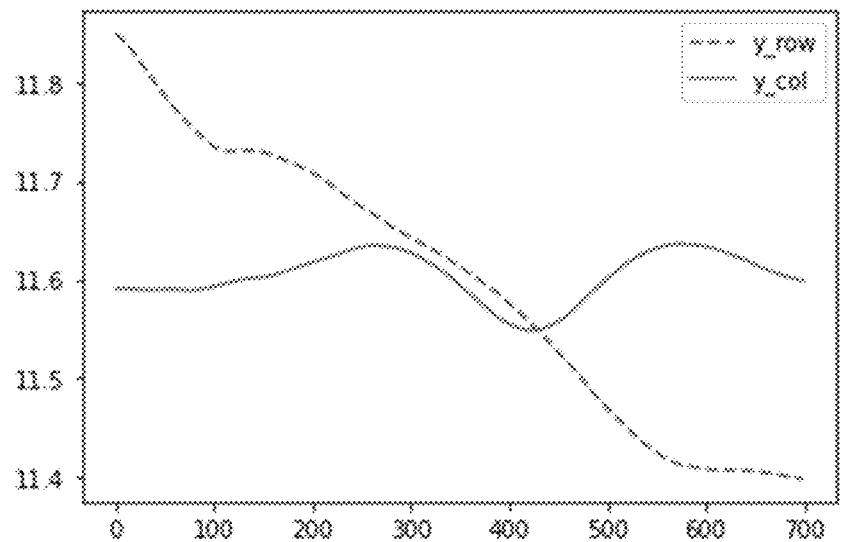
FIG. 5a and FIG. 5b are respectively finally drawn signal waveform graphs corresponding to a fundus image and an external eye image in an image classification method according to an embodiment of this application.
Figure 5:
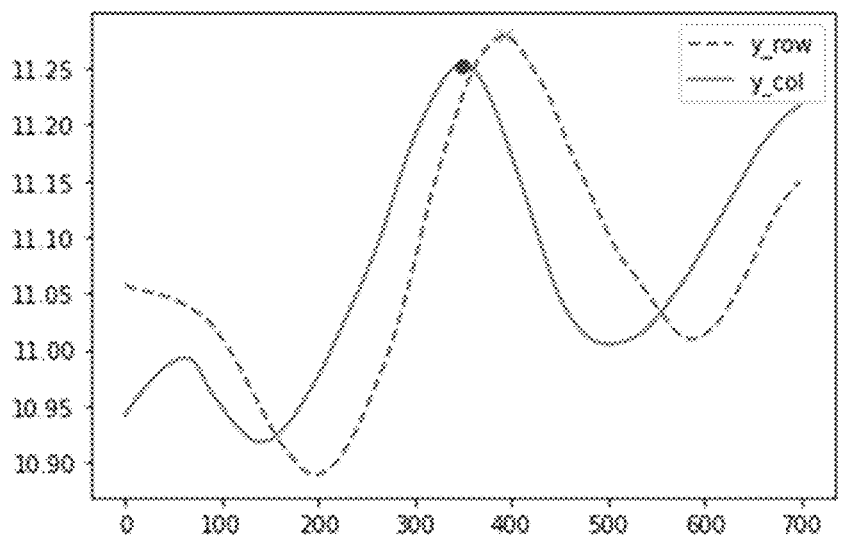

FIG. 5a and FIG. 5b are respectively signal waveform graphs if the to-be-classified image is a fundus image and if the to-be-classified image is an external eye image. In the two signal waveform graphs, detected significant peak signals are marked and displayed.

After the corresponding signal waveform graph is finally drawn and generated in the foregoing manner, determine the type of the to-be-classified image based on at least one of the change rate of the pixel values in the signal waveform curve in the signal waveform graph, the prominence of each peak in the signal waveform graph, and the percentage of the column amplitude to the row amplitude in the signal waveform curve.

When the type of the to-be-classified image is recognized and determined in the foregoing manner, it may be first determined based on monotonicity of the signal waveform curve whether the to-be-classified image is a fundus image. If it is determined based on the monotonicity of the signal waveform curve that the to-be-classified image is not a fundus image, the type of the to-be-classified image is recognized and determined based on at least one of the foregoing three pieces of information.

In a possible implementation, it may be first determined whether the signal waveform curve in the signal waveform graph is monotonically increasing or monotonically decreasing. If it is determined that the signal waveform curve is monotonically increasing or monotonically decreasing, it may be directly determined that the to-be-classified image is a fundus image. It should be noted that the monotonicity of the signal waveform curve may be determined by calculating whether a first derivative of the signal waveform curve is always greater than or equal to 0 (namely, ≥0), or is always less than or equal to 0 (namely, ≤0). If it is calculated that the signal waveform curve is always greater than or equal to 0 or is always less than or equal to 0, it indicates that the signal waveform curve is monotonically increasing or monotonically decreasing. Therefore, it may be directly determined that the to-be-classified image corresponding to the signal waveform graph is a fundus image.

If it is determined that the signal waveform curve does not have monotonicity, in other words, the signal waveform curve is not monotonically increasing or monotonically decreasing, it is determined: (a) whether a change rate delta of pixel values in a row direction and that in a column direction in the signal waveform curve are both lower than a first preset value, and (b) whether there is no significant peak with prominence greater than a second preset value in both the row direction and the column direction in the signal waveform curve.

If it is determined that the change rate delta of the pixel values in the row direction and that in the column direction in the signal waveform curve are both lower than the first preset value, and there is no significant peak with prominence greater than the second preset value in both the row direction and the column direction in the signal waveform curve, it is determined that the to-be-classified image corresponding to the signal waveform graph is a fundus image.

The first preset value and the second preset value may be flexibly set based on the actual situation. To be specific, the first preset value and the second preset value may be set based on factors such as the type of the image to be recognized, the application scenario, and an application requirement. In a possible implementation, when the image to be recognized is a fundus image or an external eye image, the first preset value may be 6%, and the second preset value may be 0.02.

If none of the drawn signal waveform graphs meet the foregoing conditions, it is determined whether the percentage percent_col_in_row of the column amplitude to the row amplitude in the signal waveform curve of the signal waveform graph exceeds a third preset value, and whether at least one of the change rate delta of the pixel values in the row direction and that in the column direction in the signal waveform curve is lower than a fourth preset value.

If it is determined that the percentage percent_col_in_row of the column amplitude to the row amplitude in the signal waveform curve exceeds the third preset value, and at least one of the change rate delta of the pixel values in the row direction and that in the column direction in the signal waveform curve is lower than the fourth preset value, it is determined that the to-be-classified image corresponding to the signal waveform graph is an external eye image.

Similarly, the third preset value and the fourth preset value may be set based on factors such as the type of the image to be recognized, the application scenario, and the application requirement. In a possible implementation, when the image to be recognized is a fundus image or an external eye image, the third preset value may be 40%, and the fourth preset value may be 6%.

In addition, in a possible implementation, if it is determined that the percentage percent_col_in_row of the column amplitude to the row amplitude in the signal waveform curve is less than a fifth preset value, it is directly determined that the to-be-classified image corresponding to the signal waveform graph is a fundus image. The fifth preset value may be 30%. The fifth preset value may alternatively be selected through testing based on factors such as the type of the image to be recognized, the application scenarios, and the application requirement in the actual situation. This is not specifically limited herein.

Further, because there are usually the plurality of to-be-classified images in the image dataset, when the type of each to-be-classified image is recognized and determined in any one of the foregoing manners, if there are still to-be-classified images that cannot be directly recognized, referring to FIG. 2, the image classification method according to the embodiments of this application may further include:

Step S500: Preprocess the to-be-classified image, locate a mark region in the to-be-classified image, and determine the type of the to-be-classified image based on a shape of the located mark region. It should be noted that the mark region is a mark position used to characterize an attribute of the to-be-classified image. Those skilled in the art can understand that the attribute of the to-be-classified image refers to the type of the image.

For example, when the image dataset includes clinical medical eye images, the mark region is a through-hole region. When the image dataset includes another type of image, the mark region is a representative position that can characterize the type of the image. No further examples are provided herein.

That the to-be-classified image is preprocessed, the mark region in the to-be-classified image is located, and the type of the to-be-classified image is determined based on the shape of the located mark region is implemented in the following manner:

The the to-be-classified image is preprocessed includes: Crop the to-be-classified image to obtain the standard image. The foregoing cropping method may be used so as to directly read the standard image having the preset size, including the specific region, and obtained by cropping the to-be-classified image with the center of the to-be-classified image as the reference center point.

Then, preprocess the standard image to obtain a black and white binary image. Specifically, in a possible implementation, that the standard image is preprocessed may include:

Perform filtering, grayscale conversion, and binarization. The preprocessing is specifically as follows: Perform Gaussian filtering on the standard image to remove part of noise. cv2.GaussianBlur may be used to perform the Gaussian filtering, and a size of a Gaussian kernel is (5, 5).

Convert a filtered standard image to a grayscale image. In this case, cv2.cvtColorc may be used.

Binarize the grayscale image obtained through the conversion. For example, cv2.threshold may be used to binarize the grayscale image.

After the standard image is preprocessed in any one of the foregoing manners, the following step is performed: Detect each connected region in the binary image. In a possible implementation, a closing operation and an opening operation are subsequently performed on the preprocessed binary image to filter out isolated noise, and then connected regions formed by dense pixels in the binary image are recognized. In a possible implementation, cv2.morphologyEx may be used to accurately recognize the connected regions formed by the dense pixels in the binary image.

Next, a connected region with a largest area is selected from the detected connected regions to determine an optimal adaptive cropping size of the image, and then a rectangle of a corresponding size is drawn in the binary image based on the determined optimal adaptive cropping size. In this process, cv2.contourArea may be used to calculate the area of the connected region. The area of the selected connected region should be greater than 20000 pixels, and a tolerance area between the connected region and an edge contour of the binary image should be greater than 2000 pixels.

Then, noise interference is removed, and a pupil position is located. The cv2.getStructuringElement method may be used to remove the noise interference around the binary image, and the cv2.morphologyEx method may be used to locate the pupil position. It should be noted that in the image classification method according to an embodiment of this application, a position of a center of the pupil may be set within an interval of [200 pixels, 660 pixels].

The mark region of the to-be-classified image can be located in the foregoing manner. After the mark region is located, the type of the to-be-classified image is determined based on the shape of the located mark region.

Figure 6:
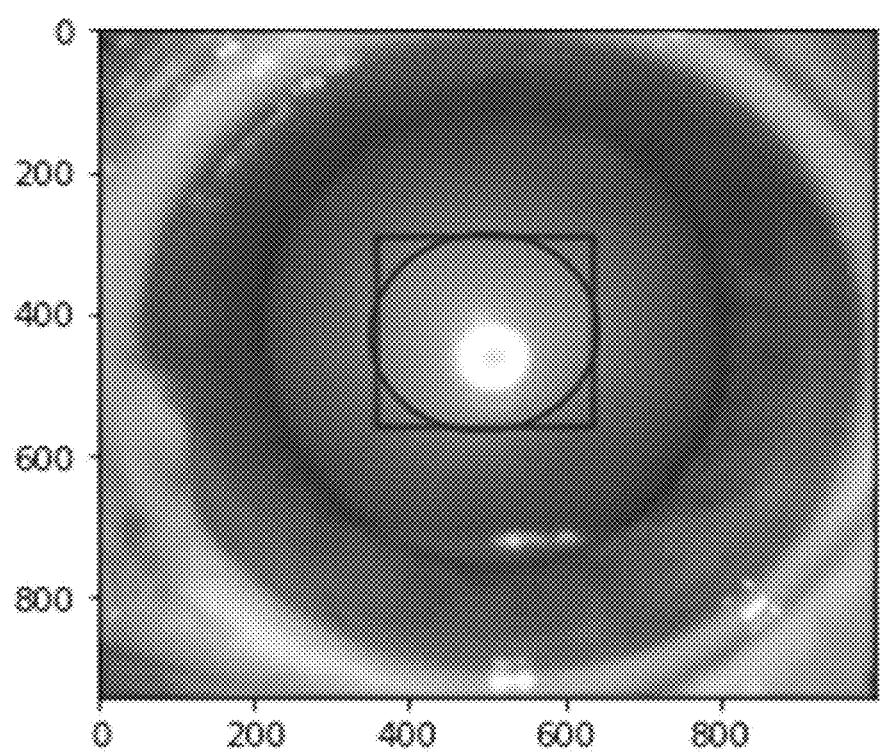
FIG. 6 is an effect diagram of detecting that a to-be-classified image is an external eye image based on a shape of a located pupil region in an image classification method according to an embodiment of this application.

Specifically, ellipse detection may be performed by using the cv2.fitEllipse method to classify fundus and external eye images. Referring to FIG. 6, if an elliptical structure with a short-axis radius within a specified interval is detected in the standard image, it is determined that the image is an external eye image. In a possible implementation, for external eye images, the interval of the short-axis radius of the pupil may be [82 pixels, 700 pixels].

Therefore, in the image classification method in this embodiment of this application, when the to-be-classified image in the image dataset is recognized and determined based on the signal waveform graph, the image data may be determined in combination with the shape of the mark region in the image. 93.7% of the images in the image dataset can be distinguished. This greatly improves accuracy of image classification. Various images acquired in application scenarios such as different eye positions, different eye shapes, different lesions, different shooting angles, and different exposure and saturation can be accurately distinguished and recognized. This effectively improves the flexibility and robustness of the image classification method.

Correspondingly, based on any of the foregoing image classification methods, this application further provides an image classification apparatus. Because the working principle of the image classification apparatus provided by this application is the same as or similar to the principle of the image classification method provided by this application, repeated details are be described again.

Figure 7:
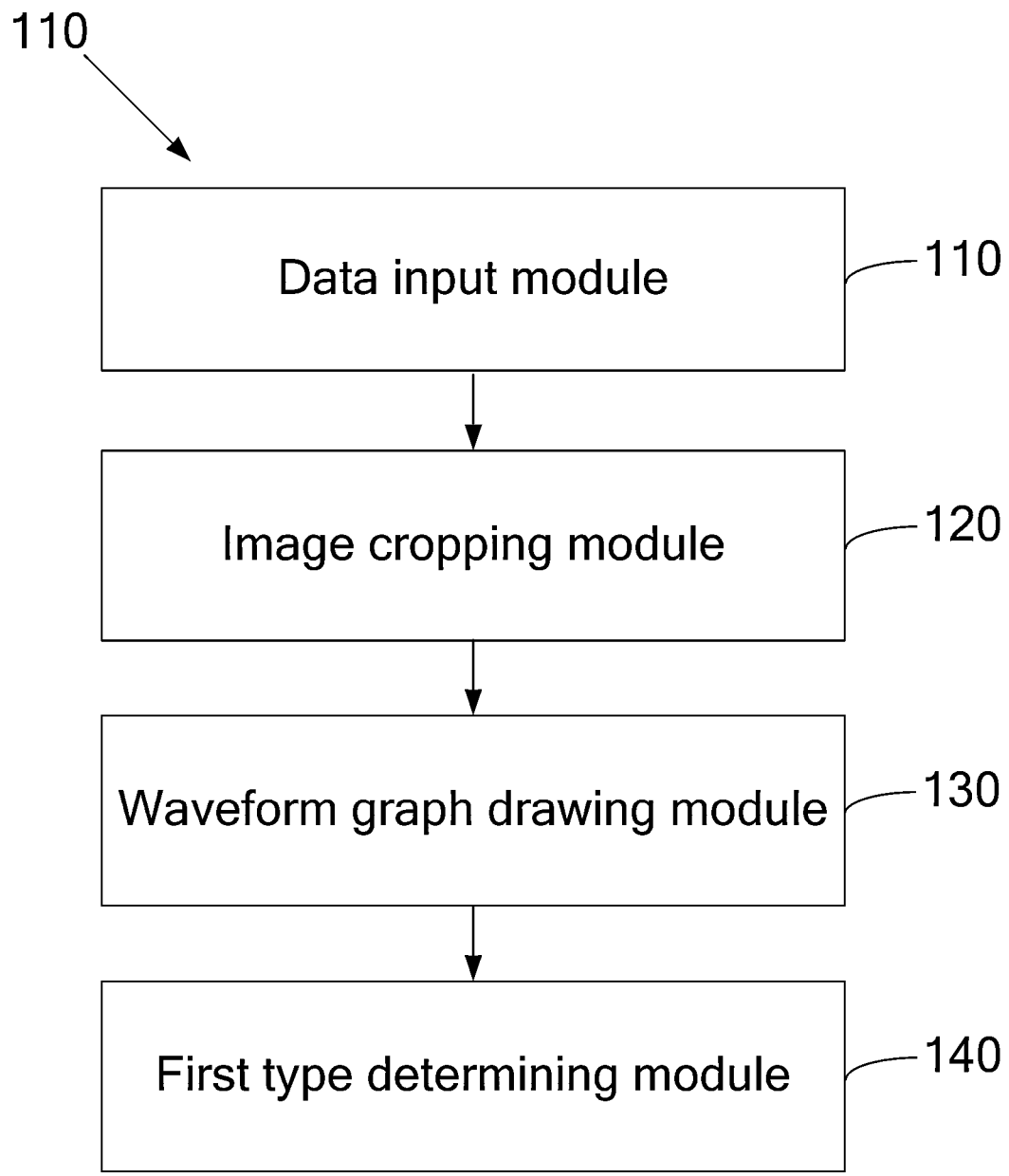
FIG. 7 is a structural block diagram of an image classification apparatus according to an embodiment of this application.

Referring to FIG. 7, an image classification apparatus 100 provided by this application includes a data input module 110, an image cropping module 120, a waveform graph drawing module 130, and a first type determining module 140. The data input module 110 is configured to input a to-be-classified image dataset, where the image dataset includes to-be-classified images. The image cropping module 120 is configured to crop each of the to-be-classified images with a center of the to-be-classified image as a reference center point to obtain an image having a preset size and including a specific region as a standard image. The waveform graph drawing module 130 is configured to select a pixel array of any single channel in the standard image and draw a corresponding signal waveform graph based on the pixel array. The first type determining module 140 is configured to determine a type of the to-be-classified image based on the signal waveform graph.

In a possible implementation, the apparatus may further include a second type determining module (not shown in the figure). The second type determining module is configured to preprocess the to-be-classified image, locate a mark region in the to-be-classified image, and determine the type of the to-be-classified image based on a shape of the located mark region.

Figure 8:
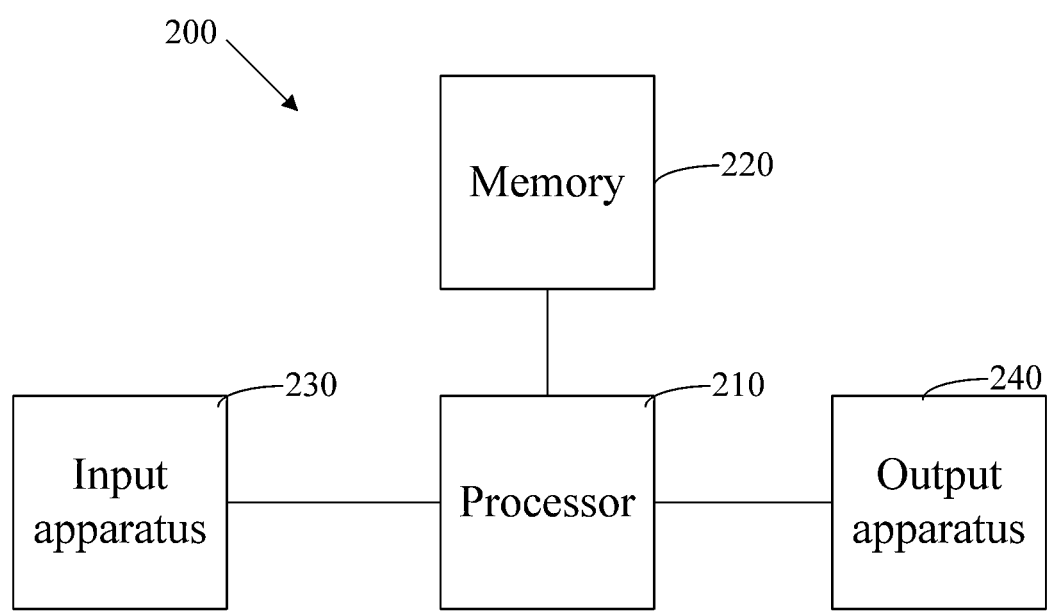
FIG. 8 is a structural block diagram of an image classification device according to an embodiment of this application.

Further, according to another aspect of this application, an image classification device 200 is provided. Referring to FIG. 8, the image classification device 200 in this embodiment of this application includes a processor 210 and a memory 220 configured to store an instruction executable by the processor 210. The processor 210 is configured to implement any one of the foregoing image classification methods when executing the executable instruction.

It should be noted that there may be one or more processors 210. The image classification device 200 in this embodiment of this application may further include an input apparatus 230 and an output apparatus 240. The processor 210, the memory 220, the input apparatus 230, and the output apparatus 240 may be connected through a bus or may be connected in other ways, which is not specifically limited herein.

As a computer-readable storage medium, the memory 220 can be used to store software programs, computer-executable programs, and various modules, such as programs or modules corresponding to the image classification method in the embodiments of this application. The processor 210 executes various functional applications and data processing of the image classification device 200 by running a software program or module stored in the memory 220.

The input apparatus 230 can be used to receive an input digital or signal. The signal may be a key signal related to user settings and function control of the device/terminal/server. The output apparatus 240 may include a display device such as a display screen.

Each embodiment of this specification is described in a progressive manner, each embodiment focuses on the difference from other embodiments, and the same and similar parts between the embodiments may refer to each other. The system disclosed in the embodiments corresponds to the method disclosed in the embodiments. Therefore, the system is described in a relatively simple manner. For the related parts, reference may be made to the description of the method parts.

In this specification, several specific embodiments are used for illustration of the principles and implementations of the present disclosure. The description of the foregoing embodiments is used to help illustrate the method of the present disclosure and the core ideas thereof. In addition, persons of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. An image classification method, comprising:
   inputting a to-be-classified image dataset, wherein the image dataset comprises to-be-classified images; and
   performing, for each to-be-classified image of the to-be-classified images, operations comprising:
   cropping the to-be-classified image with a center of the to-be-classified image as a reference center point to obtain an image having a preset size and comprising a specific region as a standard image;
   selecting a pixel array of any single channel in the standard image and drawing a signal waveform graph based on the pixel array; and
   determining a type of the to-be-classified image based on the signal waveform graph.

2. The method according to claim 1, further comprising, after the inputting a to-be-classified image dataset:
   filtering the to-be-classified images in the image dataset based on image sizes and/or image colors.

3. The method according to claim 1, wherein the selecting a pixel array of any single channel in the standard image and drawing a signal waveform graph based on the pixel array comprises:
   selecting the pixel array of the any single channel in the standard image;
   performing row compression on a row pixel array and column compression on a column pixel array in the pixel array to obtain a compressed row pixel array and a compressed column pixel array;
   performing curve smoothing on the compressed row pixel array and the compressed column pixel array; and
   drawing the signal waveform graph based on a smoothed compressed row pixel array and compressed column pixel array.

4. The method according to claim 3, wherein the following formulas are used to perform the row compression on the row pixel array and the column compression on the column pixel array in the pixel array:

$$y\_row = img\_r.sum(arr, axis=0)$$

$$y\_col = img\_r.sum(arr, axis=1)$$

wherein
   img_r.sum( ) is a summation function,
   axis=0 means a row direction,
   axis=1 means a column direction,
   arr, axis=0 represents each row pixel array,
   arr, axis=1 represents each column pixel array,
   img_r.sum(arr, axis=0) represents summation of pixel values in each row array, and
   img_r.sum(arr, axis=1) represents summation of pixel values in each column array.

5. The method according to claim 3, further comprising, after the performing curve smoothing on the compressed row pixel array and the compressed column pixel array:
   performing a logarithmic operation on the smoothed compressed row pixel array and compressed column pixel array.

6. The method according to claim 1, wherein the determining a type of the to-be-classified image based on the signal waveform graph comprises:
   determining the type of the to-be-classified image based on at least one of a change rate of pixel values in a signal waveform curve in the signal waveform graph, prominence of each peak in the signal waveform graph, and a percentage of column amplitude to row amplitude in the signal waveform curve.

7. The method according to claim 1, further comprising, when the signal waveform graph is drawn based on the pixel array:
   detecting peaks in the signal waveform graph based on a peak attribute, calculating prominence of the peaks in the signal waveform graph, and processing the signal waveform graph based on the prominence of the peaks;
   wherein the processing the signal waveform graph based on the prominence of the peaks comprises: removing peaks with prominence smaller than a preset minimum prominence threshold.

8. The method according to claim 1, further comprising:
   preprocessing the to-be-classified image, locating a mark region in the to-be-classified image, and determining the type of the to-be-classified image based on a shape of the located mark region.

9. An image classification device, comprising:
   a processor; and
   a memory configured to store an instruction executable by the processor; wherein
   the processor is configured to implement a method when executing the executable instruction; and
   the method comprises:
   inputting a to-be-classified image dataset, wherein the image dataset comprises to-be-classified images; and
   performing, for each to-be-classified image of the to-be-classified images, operations comprising:
   cropping the to-be-classified image with a center of the to-be-classified image as a reference center point to obtain an image having a preset size and comprising a specific region as a standard image;
   selecting a pixel array of any single channel in the standard image and drawing a signal waveform graph based on the pixel array; and
   determining a type of the to-be-classified image based on the signal waveform graph.

10. The image classification device according to claim 9, wherein the method further comprises, after the inputting a to-be-classified image dataset:
    filtering the to-be-classified images in the image dataset based on image sizes and/or image colors.

11. The image classification device according to claim 9, wherein the selecting a pixel array of any single channel in the standard image and drawing a signal waveform graph based on the pixel array comprises:
    selecting the pixel array of the any single channel in the standard image;
    performing row compression on a row pixel array and column compression on a column pixel array in the pixel array to obtain a compressed row pixel array and a compressed column pixel array;
    performing curve smoothing on the compressed row pixel array and the compressed column pixel array; and
    drawing the signal waveform graph based on a smoothed compressed row pixel array and compressed column pixel array.

12. The image classification device according to claim 11, wherein the following formulas are used to perform the row compression on the row pixel array and the column compression on the column pixel array in the pixel array:

$$y\_row = img\_r.sum(arr, axis=0)$$

$$y\_col = img\_r.sum(arr, axis=1)$$

wherein
- img_r.sum( ) is a summation function,
- axis=0 means a row direction,
- axis=1 means a column direction,
- arr, axis=0) represents each row pixel array,
- arr, axis=1 represents each column pixel array,
- img_r.sum(arr, axis=0) represents summation of pixel values in each row array, and
- img_r.sum(arr, axis=1) represents summation of pixel values in each column array.

13. The image classification device according to claim 11, wherein the method further comprises, after the performing curve smoothing on the compressed row pixel array and the compressed column pixel array: performing a logarithmic operation on the smoothed compressed row pixel array and compressed column pixel array.

14. The image classification device according to claim 9, wherein the determining a type of the to-be-classified image based on the signal waveform graph comprises:
- determining the type of the to-be-classified image based on at least one of a change rate of pixel values in a signal waveform curve in the signal waveform graph, prominence of each peak in the signal waveform graph, and a percentage of column amplitude to row amplitude in the signal waveform curve.

15. The image classification device according to claim 9, wherein the method further comprises, when the signal waveform graph is drawn based on the pixel array:
- detecting peaks in the signal waveform graph based on a peak attribute, calculating prominence of the peaks in the signal waveform graph, and processing the signal waveform graph based on the prominence of the peaks;
- wherein the processing the signal waveform graph based on the prominence of the peaks comprises: removing peaks with prominence smaller than a preset minimum prominence threshold.

16. The image classification device according to claim 9, wherein the method further comprises:
- preprocessing the to-be-classified image, locating a mark region in the to-be-classified image, and determining the type of the to-be-classified image based on a shape of the located mark region.

\* \* \* \* \*